(12) United States Patent
Gerwin

(10) Patent No.: US 8,972,427 B2
(45) Date of Patent: Mar. 3, 2015

(54) SYSTEM AND METHOD FOR PROVIDING ELECTRONIC SUPPLEMENTAL CONTENT ASSOCIATED WITH PRINTED CONTENT IN A PRINTED PUBLICATION

(75) Inventor: Nina Gerwin, Fairfax, CA (US)

(73) Assignee: The Eye Capture Company, Inc., San Anselmo, CA (US)

(*) Notice: Subject to any disclaimer, the term of this patent is extended or adjusted under 35 U.S.C. 154(b) by 218 days.

(21) Appl. No.: 13/189,317

(22) Filed: Jul. 22, 2011

(65) Prior Publication Data
US 2013/0024470 A1 Jan. 24, 2013

(51) Int. Cl.
*G06F 17/30* (2006.01)

(52) U.S. Cl.
CPC ............... *G06F 17/30876* (2013.01)
USPC .......................... 707/758; 382/305

(58) Field of Classification Search
CPC ............ G06F 17/30554; G06F 17/30386; G06F 17/30637; G06F 17/30047; G06F 17/30274; G06F 17/30265; G06F 17/3005; G06F 17/30106; G06F 17/30244
USPC ................................. 382/181–308
See application file for complete search history.

(56) References Cited

U.S. PATENT DOCUMENTS

| | | | |
|---|---|---|---|
| 6,108,656 A | 8/2000 | Durst et al. | |
| 7,314,178 B2 | 1/2008 | Rines et al. | |
| 7,590,259 B2 | 9/2009 | Levy et al. | |
| 7,793,230 B2 * | 9/2010 | Burns et al. | 715/787 |
| 7,899,252 B2 * | 3/2011 | Boncyk et al. | 382/181 |
| 8,095,546 B1 * | 1/2012 | Baluja et al. | 707/750 |
| 8,667,393 B2 | 3/2014 | Gerwin | 715/273 |
| 8,694,522 B1 * | 4/2014 | Pance | 707/758 |
| 8,737,737 B1 * | 5/2014 | Feldman et al. | 382/170 |
| 2002/0002563 A1 * | 1/2002 | Bendik | 707/500 |
| 2005/0162523 A1 | 7/2005 | Darrell et al. | |
| 2005/0261990 A1 * | 11/2005 | Gocht et al. | 705/27 |
| 2007/0299936 A1 * | 12/2007 | Borgendale et al. | 709/219 |
| 2008/0082903 A1 | 4/2008 | McCurdy et al. | |
| 2008/0209339 A1 * | 8/2008 | Macadaan et al. | 715/745 |
| 2010/0103241 A1 * | 4/2010 | Linaker | 348/14.02 |
| 2010/0211602 A1 * | 8/2010 | Menon et al. | 707/772 |
| 2011/0035662 A1 | 2/2011 | King et al. | 715/273 |
| 2011/0191328 A1 * | 8/2011 | Vernon et al. | 707/723 |
| 2013/0036362 A1 | 2/2013 | Gerwin | |
| 2014/0237358 A1 | 8/2014 | Gerwin | 715/273 |

\* cited by examiner

*Primary Examiner* — Michelle Owyang
(74) *Attorney, Agent, or Firm* — Pillsbury Winthrop Shaw Pittman LLP

(57) ABSTRACT

Supplemental content may be provided to users that is associated with printed content found in printed publications. Via, for example, a client computing platform a user may provide information identifying a specific publication, and then a content image (or images) representing the printed content. The content represented in the content image may be identified. This technique for identifying printed content may facilitate identification of printed content without requiring a machine-readable marker being included in the pages of the printed publication. Based on the identification of the specific printed content, supplemental content associated with the identified content may be accessed via the client computing platform.

14 Claims, 6 Drawing Sheets

SYSTEM AND METHOD FOR PROVIDING ELECTRONIC SUPPLEMENTAL CONTENT ASSOCIATED WITH PRINTED CONTENT IN A PRINTED PUBLICATION

FIELD OF THE INVENTION

The invention relates to automatically recognizing printed content within a printed publication without the use of a machine-readable marker being associated specifically with the recognized content, and to automatically providing electronic supplemental content related to the specific printed content.

BACKGROUND OF THE INVENTION

Print magazines have been struggling to find a way to present supplemental electronic content to users, in addition to their printed content. Conventional techniques rely on machine-readable markers associated with specific sets of content (e.g., a page, an ad, a specific story or article, and/or other sets of content) to identify printed content and access electronic supplemental content.

A variety of products exist that recognize images and then direct users to internet search results associated with a recognized image. These systems tend to only identify images, not specific publications or content therein, and to indiscriminately provide search results regardless of the context in which the image appears.

SUMMARY

One aspect of the invention relates to providing supplemental content to users that is associated with printed content found in printed publications. Via, for example, a client computing platform a user may provide information identifying a specific publication, and then a content image (or images) representing the printed content. The content represented in the content image may be identified. This technique for identifying printed content may facilitate identification of printed content without requiring a machine-readable marker being included in the pages of the printed publication. Based on the identification of the printed publication, directions for accessing supplemental information associated with the identified content may be provided to the client computing platform. The supplemental information may then be accessed (and/or received) on the client computing platform based on the received directions. The supplemental content may include, for example, information related to advertisers, individuals or entities featured in the content, video or audio content, and/or other supplemental content.

In order to provide supplemental content to users, stored content images representing printed content from printed publications may be organized. A system configured to perform such organization and/or storage may include electronic storage to electronically store the content images. The system may be configured to execute an identification module, a content image module, a content identification module, and/or other modules.

The identification module may be configured to obtain and/or to store publication identification information for a printed publication. The publication identification information may include one or more of a title, author, publisher, publication date, issue number, volume number, publication name, and/or other information that identifies an individual publication. The publication identification information may include text, an image of identifying content, audio information, and/or other information The content image module may be configured to obtain content images of printed content from the printed publication. The content image module may further be configured to store the content images to the electronic storage, to associate the obtained content images with the printed publication, and/or to perform other tasks or processing with respect to the content images.

The content identification module may be configured to associate individual sets of printed content represented in the obtained content images with individual content identifiers. This may include a one-to-one association (e.g., 1 set of printed content to 1 content identifier), a many-to-one association (e.g., X sets of printed content to 1 content identifier), a one-to-many association (e.g., 1 set of printed content to X content identifiers), and/or other associations. A content identifier associated with a given set of content may include directions for accessing supplemental content associated with the given set of content. Such directions may be instructions that are automatically executable by a properly configured processor. By way of non-limiting example, directions for accessing supplemental content may include a network location (e.g., a uniform resource locator and/or other network locations), and/or other information.

A system configured to provide supplemental content related to printed content in a printed publication to one or more users may include a server configured to communicate with client computing platforms associated with the users. The server may be configured to execute one or more of an identification reception module, an image reception module, a content matching module, a supplemental content module, and/or other modules. The server may be configured to access electronic storage in which publication identification information and/or associated content images are accessible. In the electronic storage a given content image may be associated with a corresponding one of the publications in which the printed content represented in the given content image appeared.

The identification reception module may be configured to receive publication identification information associated with a publication. The publication identification information may be received from a client computing platform associated with a user. The identification reception module may be configured to identify a specific publication based on the received publication identification information. This may be performed through a comparison of the received publication identification information with publication identification information stored to the electronic storage.

The image reception module may be configured to receive a user-captured image of printed content. The user-captured content image may have been captured by the client computing platform. The printed content may be from the publication identified by the identification reception module.

The content matching module may be configured such that, responsive to (i) identification of the identified publication, and (ii) reception of the user-capture image, the content matching module identifies the printed content from the user-captured image. This identification may be made by comparing the user-captured image with the stored content images associated with the identified publication. The content matching module may be configured to restrict the identification process to stored content images that are associated with the identified publication. This may enhance the efficiency, speed, accuracy, and/or other aspects of the identification of the content in the user-captured content image. Identification of the printed content may include determination of a content identifier associated with the printed content.

The supplemental content module may be configured to access, responsive to identification of the printed content in the user-captured content image, directions to supplemental content associated with the identified printed content in the user-captured content image. The directions may include, for example, a network location (e.g., a uniform resource locator) at which the supplemental content may be accessed. The directions may be accessed from the electronic storage. The supplemental content module may be configured to transmit the directions to supplemental content to the client computing platform from which the content image(s) was received. This may facilitate access to the supplemental content on the client computing platform.

A system configured to provide supplemental content related to printed content in a printed publication to a user may include one or more of an electronic display, an image capture device, one or more processors, and/or other components. One or more of these components may be associated with a client computing platform. The client computing platform may be configured to communicatively link to a server. The client computing platform may be used by the user to receive the supplemental content. The processor may be configured to execute a publication identification module, an identification transmission module, a captured content module, a content transmission module, a supplemental content presentation module, and/or other modules.

The publication identification module may be configured to receive publication identification information corresponding to a specific printed publication. The publication identification information may be received via a user interface associated with the client computing platform, via the image capture device, and/or from other sources. The publication identification information may identify a specific publication.

The identification transmission module may be configured to transmit the publication identification information to the server. The publication identification information transmitted to the server may facilitate identification of the printed publication at the server.

The captured content module may be configured to receive content images of printed content in the printed publication. The content images have been captured by the image capture device. The captured content module may be configured to process one or more of the content images. Such processing may include, for example, converting the file format, rotating, cropping, sharpening, and/or other processing.

The content transmission module may be configured to transmit received content images to the server. This may facilitate identification of the printed content represented in the content images on the server. The content transmission module may be configured such that the content images are designated to the server as being associated with previously transmitted publication identification information for the publication. This may further enable, facilitate, and/or enhance identification of the content represented in the content images on the server.

The supplemental content presentation module may be configured to receive, responsive to transmission of a content image to the server, access to supplemental content associated with the printed content represented in the content image. This may include receiving supplemental content directly from the server, receiving directions for accessing the supplemental content, and/or other mechanisms for accessing supplemental content. Directions for accessing the supplemental content may include, for example, a network location at which the supplemental content may be accessed. Accessing such supplemental content may include transmitting a request for the supplemental content to the network location, and receiving the requested supplemental content. The supplemental content presentation module may be configured to present accessed supplemental content to the user via the electronic display.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
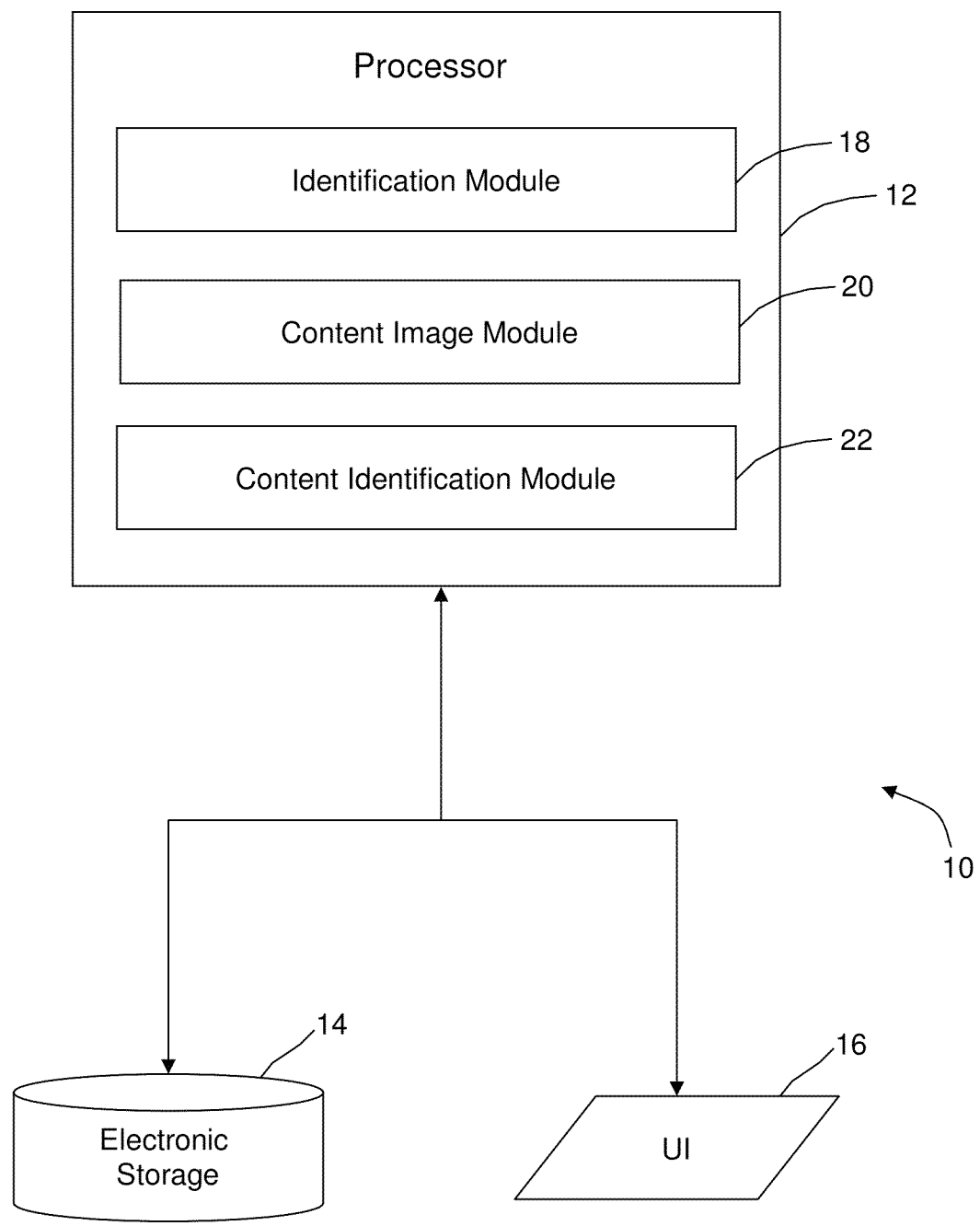
FIG. 1 illustrates a system configured to store and/or organize images of printed content.

FIG. 1 illustrates a system 10 configured to store and/or organize images of printed content. The content images may be organized into sets that correspond to the publications in which the printed content represented in the content images were printed. The publications may include one or more of a book, a magazine, a journal, a newspaper, a periodical, a book, product catalogs, maps, and/or other publications. The organization of the content images performed by system 10 may facilitate supplemental content being associated with the printed content. The supplemental content may be available to users over a network, such as the Internet and/or other networks. In some implementations, system 10 may include one or more of one or more processors 12, electronic storage 14, a user interface 16, and/or other components.

Processor 12 may be configured to execute one or more of an identification information module 18, a content image module 20, a content identification module 22, and/or other modules. Processor 12 may be configured to execute modules 18, 20, and/or 22 via software, hardware, firmware, some combination thereof, and/or through other processor configuration mechanisms.

The identification information module 18 may be configured to obtain publication identification information for printed publications. The publication identification information for a given publication may include one or more of title, author, publisher, publication date, issue number, volume number, publication name, and/or other information that identifies an individual publication. The publication identification information may include text, an image of identifying content, audio information, and/or other information. The identifying content may include a front cover of the given publication. The identifying content may include a machine-readable optical code (e.g., a bar code, QR code, and/or other codes), and/or the identifying content may be devoid of a machine-readable optical code. Other identifying content may be contemplated. The identification information module 18 may be configured to store the obtained publication identification information to electronic storage 14.

The identification information module 18 may be configured such that obtaining the publication identification information may include obtaining the publication identification information automatically and/or based on user input. The source of the publication identification information may include, for example, electronic storage, electronic communication over a network, manual data entry, an image capture device (not shown), and/or other sources.

The content image module 20 may be configured to obtain content images of printed content from printed publications. The printed publications may include the printed publications for which publication identification information has been, or will be, obtained by identification information module 18. An individual content image may represent a set of printed content. The set of printed content may include a page, a pair of pages (e.g., sitting side-by-side when the publication is open), a section or article from a publication, and/or other sets of printed content. The content image module 20 may be configured to store the content images to electronic storage 14. The content image module 20 may be configured to obtain the content images electronic storage, electronic communication over a network, an image capture device (not shown), and/or other sources.

The content image module 20 may be configured to associate the obtained content images with the printed publications from which the sets of printed content represented in the content images were printed. This association may organize the stored publication identification information and content images such that publication identification information for a given publication may be associated with a group of content images representing printed content from the individual publication. As a result, content images from the given publication may be accessed through the publication identification information for the given publication, and/or vice versa.

The content identification module 22 may be configured to associate individual sets of printed content represented in the obtained content images with individual content identifiers. This may include a one-to-one association (e.g., 1 set of printed content to 1 content identifier), a many-to-one association (e.g., X sets of printed content to 1 content identifier), a one-to-many association (e.g., 1 set of printed content to X content identifiers), and/or other associations. A content identifier associated with a given set of content may include directions for accessing supplemental content associated with the given set of content. Such directions may be instructions that are automatically executable by a properly configured processor. By way of non-limiting example, directions for accessing supplemental content may include a network location (e.g., a uniform resource locator and/or other network locations), and/or other information. The directions for accessing supplemental content may be received from electronic storage, from user input, and/or from other sources.

As will be appreciated from the description herein, system 10 may be configured to organize information related to printed publications to facilitate the identification of specific printed content from the. The information stored and/or organized by system 10 may further facilitate the provision of and/or access to supplemental content associated with printed content from publications.

Processor(s) 12 is configured to provide information processing capabilities in system 10. As such, processor 12 may include one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may include a plurality of processing units. These processing units may be physically located within the same device, or processor 12 may represent processing functionality of a plurality of devices operating in coordination.

It should be appreciated that although modules 18, 20, and 22 are illustrated in FIG. 1 as being co-located within a single processing unit, in implementations in which processor 12 includes multiple processing units, one or more of modules 18, 20, and/or 22 may be located remotely from the other modules. The description of the functionality provided by the different modules 18, 20, and/or 22 described below is for illustrative purposes, and is not intended to be limiting, as any of modules 18, 20, and/or 22 may provide more or less functionality than is described. For example, one or more of modules 18, 20, and/or 22 may be eliminated, and some or all of its functionality may be provided by other ones of modules 18, 20, and/or 22. As another example, processor 12 may be configured to execute one or more additional modules that may perform some or all of the functionality attributed below to one of modules 18, 20, and/or 22.

Electronic storage 14 may comprise electronic storage media that electronically stores information. The electronic storage media of electronic storage 14 may include one or both of system storage that is provided integrally (i.e., substantially non-removable) with server 14 and/or removable storage that is removably connectable to server 14 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 14 may include one or more virtual storage resources (e.g., cloud storage, a virtual private network, and/or other virtual storage resources). Electronic storage 14 may store software algorithms, information determined by processor 12, and/or other information.

Figure 2:
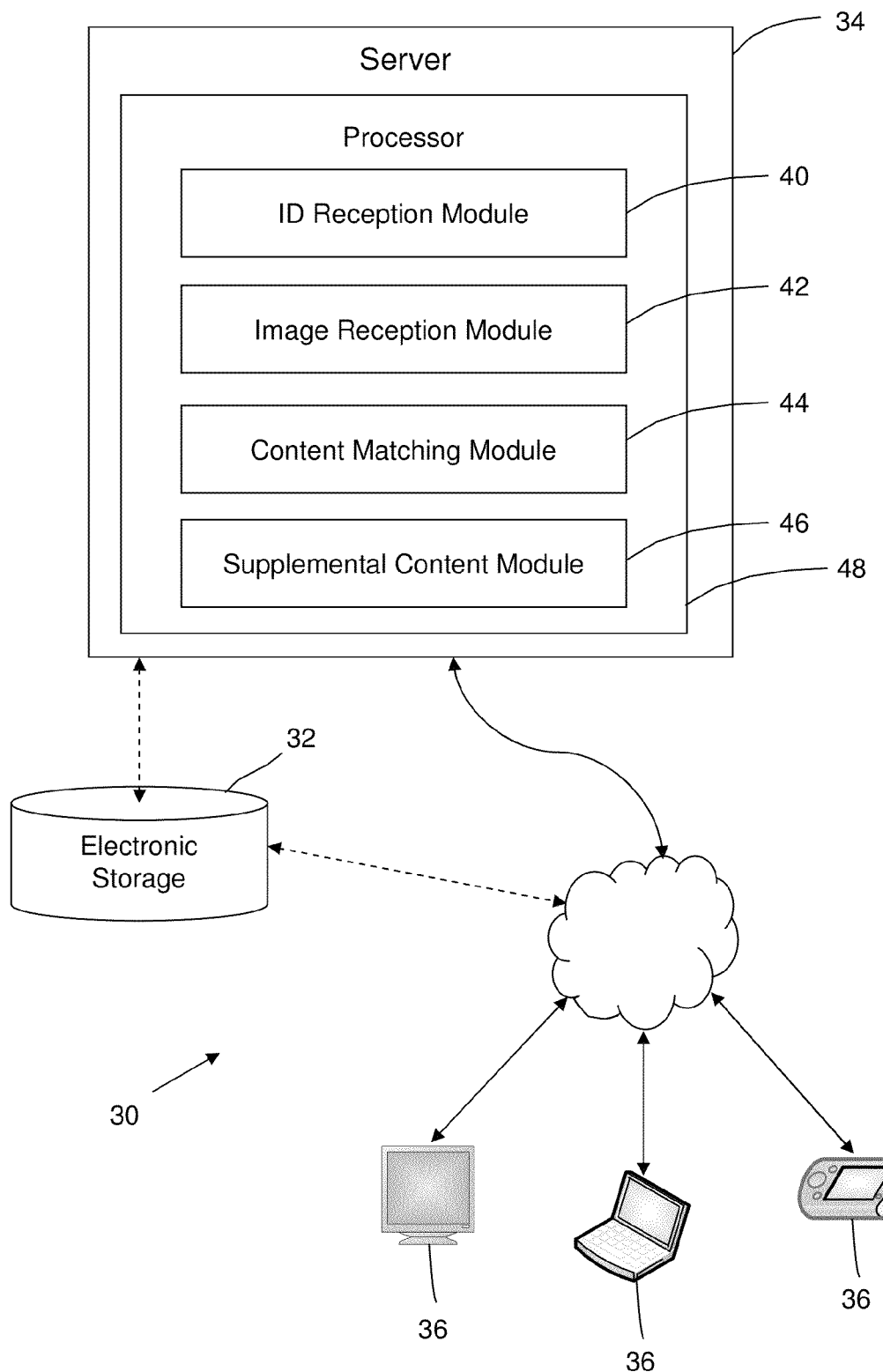
FIG. 2 illustrates a system configured to provide supplemental content associated with printed content to one or more users.

FIG. 2 illustrates a system 30 configured to provide supplemental content related to printed content to users. This may include automatically identifying the printed content, and providing electronic access to the user for supplemental content that has been associated with the printed content. In some implementations, system 30 may include one or more of electronic storage 32, a server 34, one or more client computing platforms 36, and/or other components.

The electronic storage 32 may be configured to store information related to a set of printed publications. This information may include publication identification information, content images, content identifiers, and/or other information. The publication identification information, content images, and/or content identifiers may be organized in the manner described above with respect to the information stored by system 10 to electronic storage 14 (shown in FIG. 1 and described here). For example, content images representing printed content may be associated with publication identification information for the publications in which the printed content appeared. Content identifiers may be associated with individual content images and/or sets of printed content. The content identifiers may include network locations at which supplemental content associated with the sets of printed content is accessible.

The server 34 may be configured to communicate with client computing platforms 36 according to a client/server architecture. The users may access system 30 via client computing platforms 36.

The server 34 may be configured to execute one or more computer program modules. The computer program modules may include one or more of an identification reception module 40, an image reception module 42, a content matching module 44, a supplemental content module 46, and/or other modules.

The identification reception module 40 may be configured to receive publication identification information associated with a publication. The publication identification information may be received from one of client computing platforms 36, and/or from other sources. The publication identification information may include an image of identifying content, audio information (e.g., spoken by a user), text, and/or other information specifying a specific publication. The identifying content may include, for example, a front cover of the publication, and/or other identifying content.

Based on the received publication identification information, identification reception module 40 may be configured to identify one of the printed publications from the set of printed publications. This may involve comparing the received publication identification information with the stored publication identification information to identify a match. As will be appreciated from the description of publication identification information herein, depending on the format of the publication identification information received and/or stored, identifying matching publication identification information may include image comparisons, audio comparisons, textual comparisons, and/or other comparisons. Responsive to identification of a match between received publication identification information and stored publication identification information, identification reception module 40 may be configured to request user confirmation of the match (e.g., through communication with client computing platform 36).

In some implementations, the publication identification information received by identification reception module 40 may be in a different format than the stored publication identification information. In such implementations, identification reception module 40 may be configured to translate the format of the received and/or stored publication identification information to facilitate comparison and/or matching. For example, such translation may include speech-to-text, image conversion, and/or other translations.

The image reception module 42 may be configured to receive content images from users. The content images may be received by image reception module 42 from client computing platforms 36. The content images may be user captured content images of printed content from printed publications. For example, a user may use one of client computing platforms 36 to capture an image of printed content, and the client computing platform 36 may transmit the captured image to image reception module 42.

The content matching module 44 may be configured to identify printed content depicted in content images received by image reception module 42. This may be achieved for a given received content image from a given client computing platform 36 by comparing the given received content image with stored content images.

To facilitate, enhance, and/or speed up this matching process, content matching module 44 may work on conjunction with identification reception module 40. For example, during operation, identification reception module 40 may receive publication identification information from one of client computing platforms 36, followed by a content image from the publication corresponding to the received publication identification information. The content matching module 44 may be configured such that responsive to reception of such information, content matching module 44 searches for a match of the received content image in the stored content images corresponding to the publication for which publication identification information was received. This may narrow the field of potential matches for the content image, while facilitating the identification of printed content without requiring a machine-readable code for the specific set of content being identified. Responsive to no match being identified between the received content image and the stored content images corresponding to the publication for which publication identification information was received, content matching module 44 may be configured to trigger an error. This may result in a notification and/or alert being provided to the user (e.g., via client computing platform 36).

To facilitate matching of the received content images with stored content images, content matching module 44 may be configured to process the received content images. This may include one or more of converting a file format, cropping, rotating, sharpening, filtering, and/or other processing.

The supplemental content module 46 may be configured to transmit directions to supplemental content associated with the printed content in the received content images. This may include, responsive to reception of a content image and identification of the printed content in the content image by content matching module 44, transmitting directions to supplemental content associated with the identified printed content. The directions may include, for example, a network location (e.g., a uniform resource locator, and/or other network locations) at which the supplemental content may be accessed. The supplemental content module 46 may be configured to transmit the directions to the client computing platform 36 from which the content image was received. The directions may be configured to cause the client computing platform 36 to request the supplemental content from the network location. The supplemental content module 46 may obtain the network locations for supplemental content corresponding to the identified printed content from electronic storage 32.

A given client computing platform 36 may include one or more processors configured to execute computer program modules. The computer program modules may be configured to enable an expert or user associated with the given client computing platform 36 to interface with system 30 (e.g., as described herein), and/or provide other functionality attributed herein to client computing platforms 36. By way of non-limiting example, the given client computing platform 36 may include one or more of a desktop computer, a laptop computer, a handheld computer, a NetBook, a Smartphone, a gaming console, and/or other computing platforms.

The server 34 may include one or more processors 48, and/or other components. The server 34 may include communication lines and/or or ports to enable the exchange of information with a network and/or other computing platforms. Illustration of server 34 in FIG. 1 is not intended to be limiting. The server 34 may include a plurality of hardware, software, and/or firmware components operating together to provide the functionality attributed herein to server 34. For example, server 34 may be implemented by a cloud of computing platforms operating together as server 34.

Figure 3:
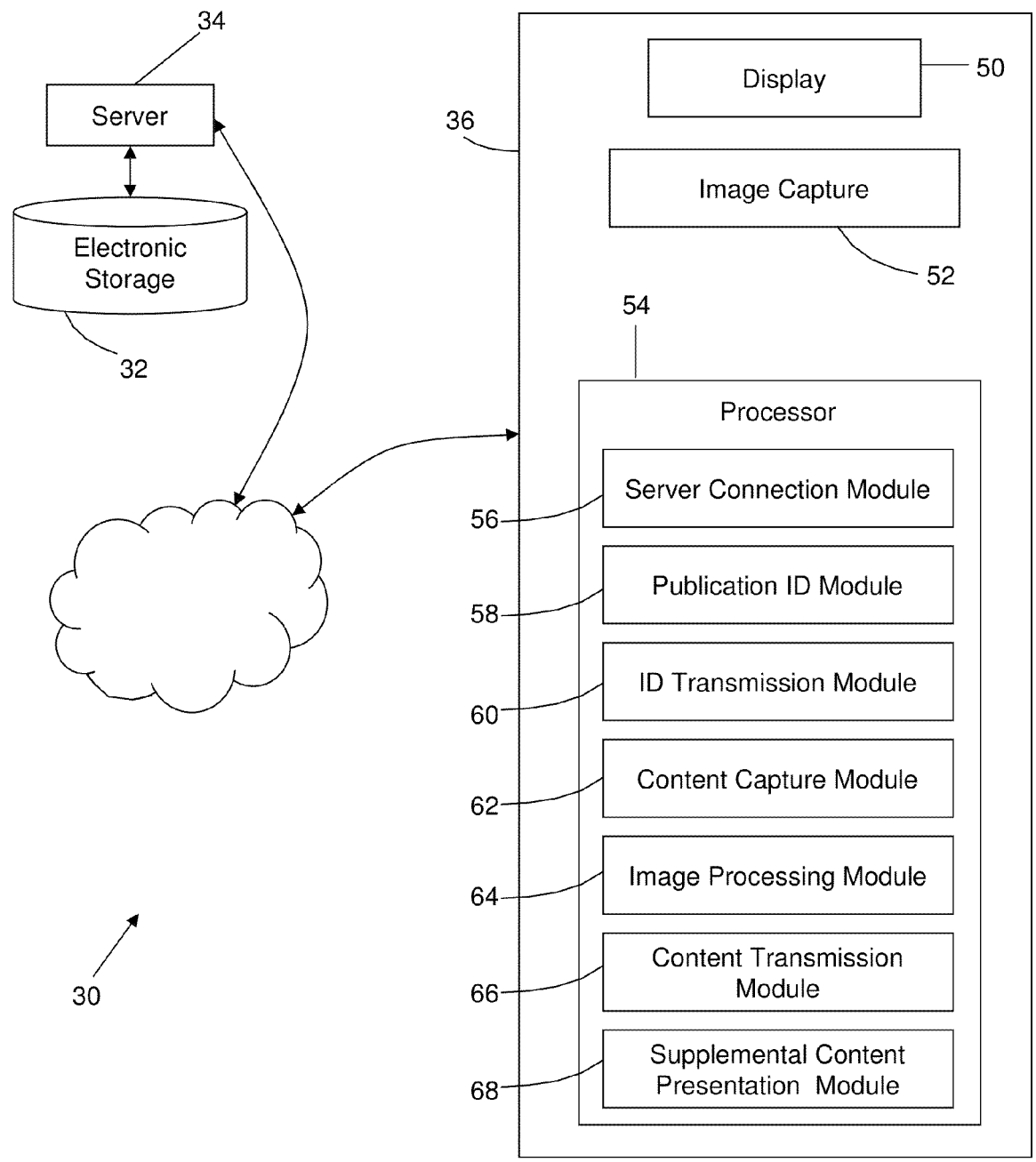
FIG. 3 illustrates a system configured to provide supplemental content associated with printed content to a user.

FIG. 3 illustrates one of client computing platforms 36 in system 30 configured to provide supplemental content related to printed content in printed publications to a user of the illustrated client computing platform 36. To facilitate providing supplemental content to the user, client computing platform 36 may be communicatively linked with server 34 (illustrated in FIG. 3 without modules 40, 42, 44, and/or 46). The client computing platform 36 may include one or more of an electronic display 50, an image capture device 52, one or more processors 54, and/or other components.

As can be seen in FIG. 3, processor 54 configured to execute one or more of a server connection module 56, a publication identification module 58, an identification transmission module 60, a content capture module 62, an image processing module 64, a content transmission module 66, a supplemental content presentation module 68, and/or other modules. The processor 54 may be configured to execute one or more of modules 56, 58, 60, 62, 64, 66, and/or 68.

The server connection module 56 may be configured to monitor a strength of a communication connection between client computing platform 36 and server 34. This may include monitoring a wireless signal strength, a connection speed, and/or other measures of connection speed, and/or reliability. Monitoring the strength of the communication connection with server 34 may include determining whether the strength of connection has crossed a threshold strength. It will be appreciated that discussion herein of "the connection" between server 34 and client computing platform 36 is not limited to a single communication pathway, protocol, or set of protocols. For example, "the connection" may refer to an RF communication connection (e.g., CDMA, 3G, and/or other RF communication connections) and/or a WiFi connection that may be used alternatively to each other by the same client computing platform 36 and server 34 to communicate.

The publication identification module 58 may be configured to receive publication identification information corresponding to specific printed publications. The publication identification information may be received from a user via a user interface associated with client computing platform 36. The publication identification information for a given publication may include image information, text, audio information (e.g., a spoken identification and/or other audio information), and/or other information. In some implementations, the publication identification information includes image information that includes an image of identifying content from the given publication. The identifying content may include a front cover of the given publication. The identifying content may include a machine-readable optical code (e.g., a bar code, QR code, and/or other codes), and/or the identifying content may be devoid of a machine-readable optical code. Other identifying content may be contemplated.

The identification transmission module 60 may be configured to transmit received publication identification information to server 34. This may facilitate identification of printed publications at server 34 (e.g., by identification reception module 40 shown in FIG. 2 and described herein), and/or other functionality at server 34. The identification transmission module 60 may be configured to transmit the received publication identification information to server 34 via the connection monitored by server connection module 56. Responsive to a determination by server connection module 56 that the strength of the connection with server 34 has breached the threshold strength, identification transmission module 60 may be configured to store the publication identification information locally on client computing platform 36 until a connection with server 34 of sufficient strength is established. Responsive to such a hold being placed on transmission to server 34, an alert or notification may be provided on client computing platform 36 to the user.

The content capture module 62 may be configured to receive content images of printed content in printed publications. The content images received by content capture module 62 may have been captured by image capture device 52. The content capture module 62 may be configured to present an interface to a user through which the user selects, enters, and/or indicates a received content image should be associated with publication identification information for the publication from which the content image was captured. This may include providing an interface to the user usable by the user to capture the content image with image capture device 52. The publication identification information to be associated with the captured content image may include publication identification information provided to client computing platform 36 (e.g., through publication identification module 58) before and/or after the captured content image is captured.

The image processing module 64 may be configured to process captured content images. Such processing may include one or more of converting a file format, cropping, rotating, sharpening, filtering, and/or other processing. The processing provided by image processing module 64 may facilitate matching the captured content images with stored content images by server 34.

The content transmission module 66 may be configured to transmit captured content images to server 34 for matching with stored content images. The transmission of content images by content transmission module 66 and/or the transmission of publication identification information by publication identification module 58 may indicate the association of individual transmitted content images with transmitted publication identification information. For example, the publication identification information and the associated content image(s) may be included in the same transmission, transmitted in consecutive or linked transmissions, and/or associated in other ways. This may facilitate identification of the publication from which a given content image was captured, and then the identification of specific content in the publication that is represented in the given content image. For example, such identification may be performed by server 34 in accordance with the description provided herein.

The content transmission module 66 may be configured to transmit the captured content images to server 34 via the connection monitored by server connection module 56. Responsive to a determination by server connection module 56 that the strength of the connection with server 34 has breached the threshold strength, content transmission module 66 may be configured to store the captured content image(s) information locally on client computing platform 36 until a connection with server 34 of sufficient strength is established. Responsive to such a hold being placed on transmission to server 34, an alert or notification may be provided on client computing platform 36 to the user.

The supplemental content presentation module 68 may be configured to receive, responsive to transmission of a captured content image to server 34, access to supplemental content associated with the printed content represented in the captured content image. This may include receiving directions to the supplemental content, requesting the supplemental content according to the received directions, receiving the supplemental content, and/or other activities. The received directions may include, for example, a network location (e.g., a uniform resource locator). Requesting the supplemental content may include transmitting a request for the supplemental content to the uniform resource locator. The supplemental content may be hosted by a server (e.g., a web server) that is separate from server 34.

The supplemental content presentation module 68 may be configured to present the received supplemental content to the user via electronic display 50, and/or via other output devices associated with client computing platform 36. The supplemental content may include one or more of an image, textual content, audio content, and/or other content. The supplemental content may include additional information related to the printed content captured in a captured content image. The presentation of the supplemental content to the user may enhance the experience of the user with respect to the printed content.

Figure 4:
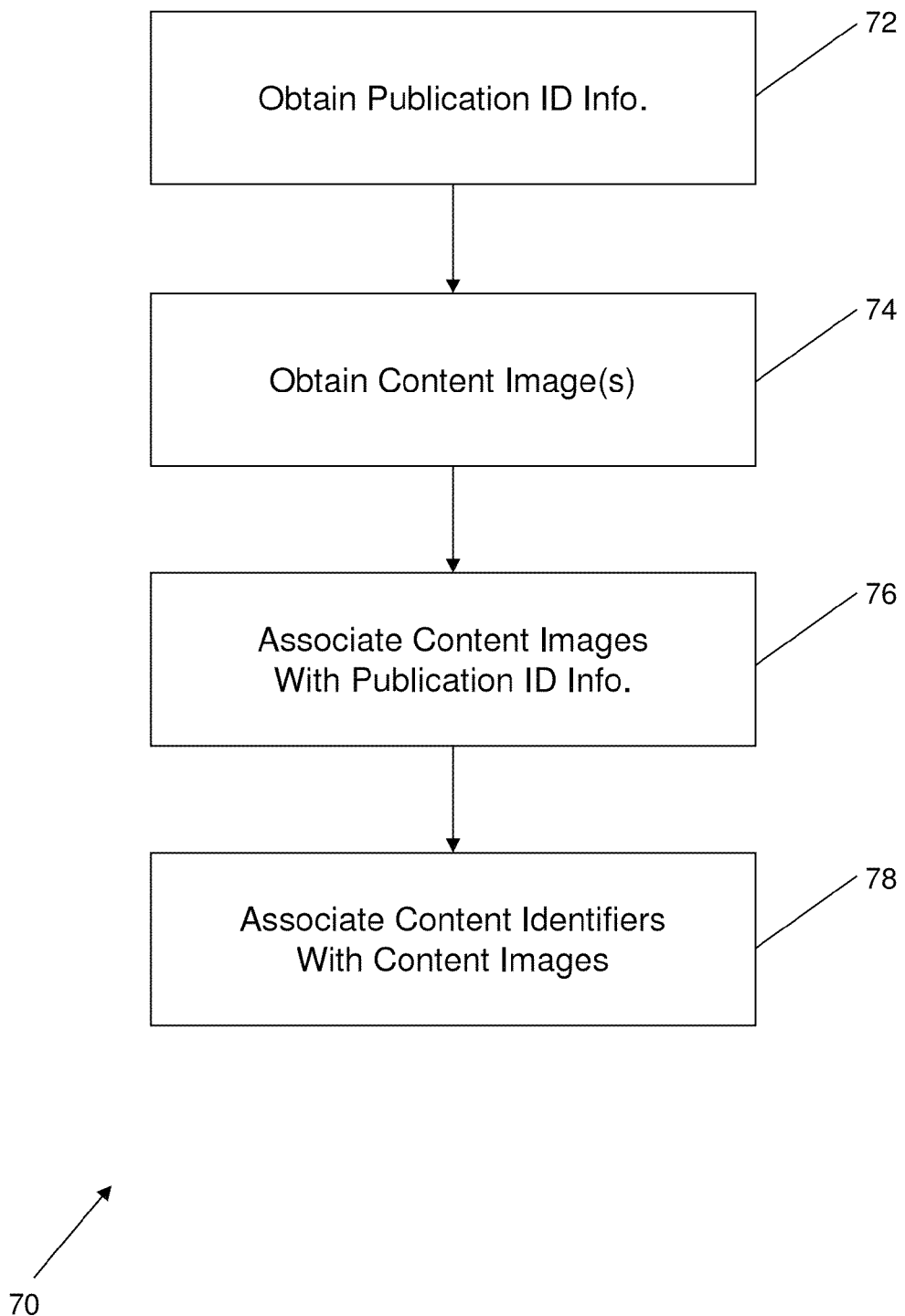
FIG. 4 illustrates a method of storing and/or organizing images of printed content.

FIG. 4 illustrates a method 70 of associating content in a printed publication with supplemental content. The operations of method 70 presented below are intended to be illustrative. In some embodiments, method 70 may be accomplished with one or more additional operations not described, and/or without one or more of the operations discussed. Additionally, the order in which the operations of method 70 are illustrated in FIG. 4 and described below is not intended to be limiting.

In some embodiments, method 70 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 70 in response to instructions stored electronically on an electronic storage medium. The one or more processing devices may include one or more devices configured through hardware, firmware, and/or software to be specifically designed for execution of one or more of the operations of method 70.

At an operation 72, publication identification information may be obtained for a printed publication. The publication identification information may be stored in electronic storage. The publication identification information may include one or more of a title, author, publisher, publication date, issue number, volume number, publication name, and/or other information that identifies an individual publication. The publication identification information may include text, an image of identifying content, audio information, and/or other information. In some implementations, operation 72 may be performed by an identification information module similar to or the same as identification information module 18 (shown in FIG. 1 and described herein).

At an operation 74, content images for the printed publication may be obtained and/or stored. The content images may represent printed content from the printed publication. In some implementations, operation 74 may be performed by a content image module similar to or the same as content image module 20 (shown in FIG. 1 and described herein).

At an operation 76, the content images obtained at operation 74 may be associated with the publication identification information obtained at operation 72. This may include organizing the storage of the publication identification information and/or the content images, tagging the content images as being associated with the publication identification information, and/or other techniques for associating electronically stored information. In some implementations, operation 76 may be performed by a content image module similar to or the same as content image module 20 (shown in FIG. 1 and described herein).

At an operation 78, content identifiers may be associated with the content images obtained at operation 74. This may include associating individual content identifiers with individual content images, associating individual content identifiers with individual portions of content represented in the content images, and/or other associations. A content identifier associated with a given set of content may include directions for accessing supplemental content associated with the given set of content. Such directions may be instructions that are automatically executable by a properly configured processor. By way of non-limiting example, directions for accessing supplemental content may include a network location (e.g., a uniform resource locator and/or other network locations), and/or other information. In some implementations, operation 78 may be performed by a content identifier module similar to or the same as content identifier module 22 (shown in FIG. 1 and described herein).

Figure 5:
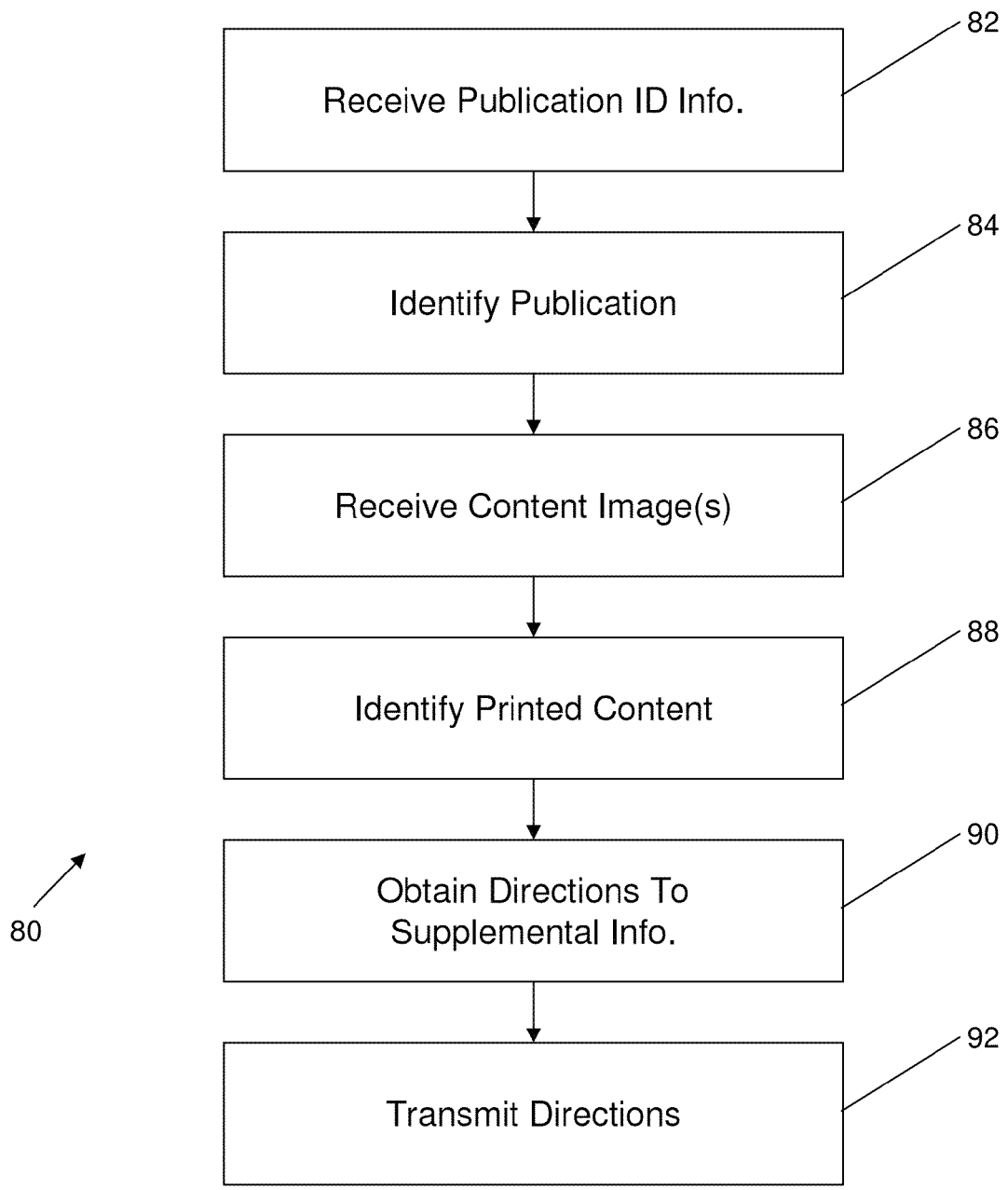
FIG. 5 illustrates a method of providing supplemental content associated with printed content to one or more users.

FIG. 5 illustrates a method 80 of providing supplemental content related to printed content in a printed publication to one or more users. The operations of method 80 presented below are intended to be illustrative. In some embodiments, method 80 may be accomplished with one or more additional operations not described, and/or without one or more of the operations discussed. Additionally, the order in which the operations of method 80 are illustrated in FIG. 5 and described below is not intended to be limiting.

In some embodiments, method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80.

At an operation 82, publication identification information associated with a printed publication may be received. The publication identification information may be received, for example, in a transmission from a client computing platform associated with a user. In some implementations, operation 82 may be performed by an identification reception module similar to or the same as identification reception module 40 (shown in FIG. 2 and described herein).

At an operation 84, the printed publication may be identified based on the received publication identification information. In some implementations, operation 84 may be performed by an identification reception module similar to or the same as identification reception module 40 (shown in FIG. 2 and described herein).

At an operation 86, one or more content images representing content in the printed publication may be received. The one or more content images may be user-captured. The one or more content images may be received via transmission from a client computing platform associated with a user. In some implementations, operation 86 may be performed by an image reception module similar to or the same as image reception module 42 (shown in FIG. 2 and described herein).

At an operation 88, the content image received at operation 84 may be matched with one or more stored content images associated with the printed publication. This may identify printed content from the received content image. In some implementations, operation 88 may be performed by a content matching module similar to or the same as content matching module 44 (shown in FIG. 2 and described herein).

At an operation 90, directions for accessing supplemental content associated with the content identified at operation 88 may be obtained. This may include obtaining the directions based on the identification of the identified content at operation 88. The directions may include a content identifier. The content identifier may include, for example, a network location at which the supplemental content may be accessed over a network, and/or other information. In some implementations, operation 90 may be performed by a supplemental content module similar to or the same as supplemental content module 46 (shown in FIG. 2 and described herein).

At an operation 92, the directions obtained at operation 90 may be transmitted to the user. This may include transmitting the directions to the client computing platform associated with the user. The transmission of the directions at operation 92 may facilitate access of the supplemental content by the client computing platform. In some implementations, operation 92 may be performed by a supplemental content module similar to or the same as supplemental content module 46 (shown in FIG. 2 and described herein).

Figure 6:
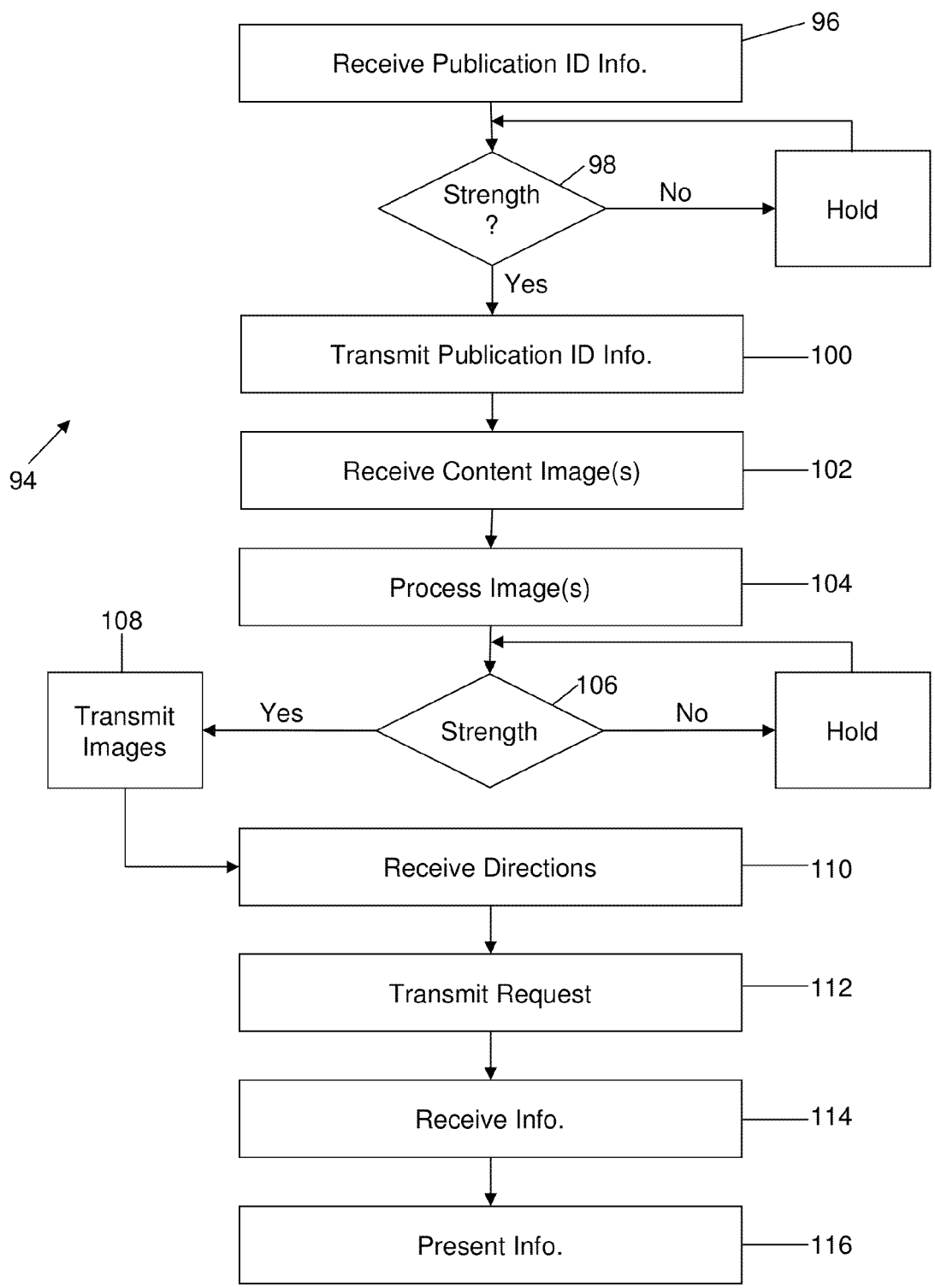
FIG. 6 illustrates a method of providing supplemental content associated with printed content to a user.

FIG. 6 illustrates a method 94 of providing supplemental content related to printed content in a printed publication to a user. The operations of 94 80 presented below are intended to be illustrative. In some embodiments, method 94 may be accomplished with one or more additional operations not described, and/or without one or more of the operations discussed. Additionally, the order in which the operations of method 94 are illustrated in FIG. 6 and described below is not intended to be limiting.

In some embodiments, method 94 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 94 in response to instructions stored electronically on an electronic storage medium. The one or more processing devices may include one or more devices configured through hardware, firmware, and/or software to be specifically designed for execution of one or more of the operations of method 94.

At an operation 96, publication identification information associated with a printed publication may be received. The publication identification information may include one or more of a title, author, publisher, publication date, issue number, volume number, publication name, and/or other information that identifies an individual publication. The publication identification information may include text, an image of identifying content, audio information, and/or other information. The publication identification information may be entered, selected, captured, and/or received in other ways by or from a user. In some implementations, operation 96 may be performed by a publication identification information module similar to or the same as publication identification information module 58 (shown in FIG. 3 and described herein).

At an operation 98, a strength of a communication connection may be monitored. The communication connection may be between a client computing platform and a server. Responsive to the strength of the communication connection falling below a threshold level, the publication identification information received at operation 96 may be held (e.g., in electronic storage) until a further time (as represented in FIG. 6). Responsive to the strength of the communication connection being above the threshold level, method 94 may proceed to an operation 100. In some implementations, operation 98 may be performed by a server connection module similar to or the same as server connection module 56 (shown in FIG. 3 and described herein).

At operation 100, the publication identification information received at operation 96 may be transmitted to a server. This may facilitate identification of the printed publication on the server. In some implementations, operation 100 may be performed by an identification transmission module similar to or the same as identification transmission module 60 (shown in FIG. 3 and described herein).

At an operation 102, one or more content images of printed content in the printed publication may be received. The content image(s) may be captured by the client computing platform associated with the user, and/or other image capture devices. In some implementations, operation 102 may be performed by a content capture module similar to or the same as content capture module 62 (shown in FIG. 3 and described herein).

At an operation 104, the content image(s) received at operation 102 may be processed. This processing may include changing a file format, cropping, rotating, sharpening, associating the content image(s) with the publication identification information received at operation 96, and/or other processing. In some implementations, operation 104 may be performed by an image processing module similar to or the same as image processing module 64 (shown in FIG. 3 and described herein).

At an operation 106, the strength of the communication connection may be monitored. Responsive to the strength of the communication connection falling below a threshold level, the content image(s) may be held (e.g., in electronic storage) until a further time (as represented in FIG. 6). Responsive to the strength of the communication connection being above the threshold level, method 94 may proceed to an operation 108. In some implementations, operation 106 may be performed by a server connection module similar to or the same as server connection module 56 (shown in FIG. 3 and described herein).

At an operation 108, the content image(s) may be transmitted to the server. This may facilitate identification of the printed content represented in the content image(s) on the server. The content image(s) may be transmitted such that they are designated as being associated with the publication identification information. In some implementations, operation 108 may be performed by a content transmission module similar to or the same as content transmission module 66 (shown in FIG. 3 and described herein).

At an operation 110, directions for accessing supplemental content associated with the content represented in the content image(s) may be received (e.g., from the server). The directions may include, for example, a network location at which the supplemental is available. In some implementations, operation 110 may be performed by a supplemental content presentation module similar to or the same as supplemental content presentation module 68 (shown in FIG. 3 and described herein).

At an operation 112, the supplemental content may be requested in accordance with the directions received at operation 110. This may include transmitting a request for the supplemental content to the network location included in the directions received at operation 110. In some implementations, operation 112 may be performed by a supplemental content presentation module similar to or the same as supplemental content presentation module 68 (shown in FIG. 3 and described herein).

At an operation 114, the supplemental content requested at operation 112 may be received. In some implementations, operation 114 may be performed by a supplemental content presentation module similar to or the same as supplemental content presentation module 68 (shown in FIG. 3 and described herein).

At an operation 116, supplemental content received at operation 114 may be presented to the user. This may include displaying the supplemental content in an electronic display associated with the client computing platform of the user. In some implementations, operation 116 may be performed by a supplemental content presentation module similar to or the same as supplemental content presentation module 68 (shown in FIG. 3 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to associate content from a printed publication with supplemental content, the system comprising:
   electronic storage;
   computer program modules; and
   one or more processors configured to execute the computer program modules, wherein the computer program modules comprising:
   an identification module configured to:
      receive a first user-captured image and a second user-captured image together in a single transmission from a user, wherein the first user-captured image is different from the user second-captured image, wherein the first user-captured image identifies a printed publication of a set of printed publications;
      identify the printed publication of the set of printed publications based on the first user-captured image;
      obtain publication identification information for the identified printed publication, wherein the identified printed publication is a periodical publication; and
      store the obtained publication identification information in the electronic storage;
   a content image module configured to:
      obtain content images of printed content from the set of printed publications;
      associate the obtained content images with individual ones of the set of printed publications such that publication identification information of a given printed publication identified by the identification module is associated with corresponding content images of printed content from the given printed publication;
      obtain an individual content image of the obtained content images that represents at least a portion of a page in the identified printed publication, wherein the individual content image is the second user-captured image;
      associate the obtained individual content image with the identified printed publication; and
      store the obtained content images and obtained individual content image in the electronic storage;
   a content identification module configured to:
      identify the individual content image based on comparing the second user-captured image with the obtained content images, responsive to identification of the identified printed publication;
      associate printed content represented by the identified individual content image with a content identifier, wherein the content identifier identifies supplemental content related to the associated printed content;
      obtain the supplemental content using the content identifier, wherein the supplemental content is not included in the identified printed publication, and wherein the supplemental content includes an image related to the individual content image; and
      transmit the supplemental content to the user via internet.

2. The system of claim 1, wherein the first user-captured image includes an image of a front cover of the identified printed publication.

3. The system of claim 1, wherein the content identifier is associated with a network location at which the supplemental content is available over a network.

4. A system configured to provide supplemental content related to printed content from a printed publication to one or more users, the system comprising:
   an electronic storage configured to store information related to a set of printed publications, wherein the information includes content images representing printed content from the set of printed publications, wherein a given content image is associated with a particular one of the printed publications in which the printed content appeared;
   computer program modules; and
   one or more processors of a server configured to execute the computer program modules, wherein the computer program modules comprising:
   an image reception module configured to:
      receive content images of a particular printed content from the set of printed publications from a user, including a first user-captured image and a second user-captured image together in a single transmission, wherein the first user-captured image is different from the second user-captured image, wherein the first user-captured image identifies a printed publication of the set of printed publications;
   an identification reception module configured to:
      receive publication identification information associated with the set of printed publications;
      identify the printed publication of the set of printed publications based on the first user-captured image and the information stored in the electronic storage, wherein the identified printed publication is a periodical publication;
   a content matching module configured to:
      identify printed content from the second user-captured image by comparing the second user-captured image with one or more of the content images stored in the electronic storage, responsive to
         (i) reception of the first user-captured image,
         (ii) identification of the identified printed publication from the set of printed publications by the identification reception module, and
         (iii) reception of the second user-captured image by the image reception module, wherein the second image represents a portion of a page in the identified printed publication; and a supplemental content module configured to:
obtain supplemental content associated with the identified printed content from the second user-captured image, wherein the supplemental content is not included in the identified printed publication, and wherein the supplemental content includes an image related to the identified printed content; and transmit the supplemental content via internet to the user.

5. The system of claim 4, wherein the electronic storage is further configured to store network locations associated with the printed content represented by the content images stored in the electronic storage, and wherein the supplemental content module is further configured to obtain the supplemental content from a network location stored in the electronic storage.

6. The system of claim 4, wherein the content images stored in the electronic storage include identifying content from individual ones of the set of printed publications,
wherein the first user-captured image includes particular identifying content from the identified printed publication,
wherein the identification reception module is further configured to identify the printed publication based on a comparison of the particular identifying content with the content images stored in the electronic storage.

7. The system of claim 6, wherein the identifying content from the identified printed publication comprises a front cover.

8. The system of claim 4, wherein the content matching module is further configured to identify the printed content from the second user-captured image without using a machine readable optical code in the printed content.

9. A system configured to provide supplemental content related to printed content from a printed publication to a user, the system comprising:
a server;
an electronic storage configured to store information related to a set of printed publications, wherein the information includes content images representing printed content from the set of printed publications, wherein a given content image is associated with a particular one of the printed publications in which the printed content appeared;
a client computing platform communicatively linked with the server, the client computing platform comprising:
an electronic display:
an image capture device configured to capture images electronically, wherein the images include a first image and a second image, wherein the first image is different from the second image, and wherein the image capture device is controlled by the user;
client computer program modules; and
one or more processors configured to execute the client computer program modules, the client computer program modules comprising:
a publication identification module configured to receive publication identification information, including the first image and the second image captured by the image capture device, wherein the first image identifies a printed publication of the set of printed publications, wherein the second image includes a particular printed content from the printed publication, wherein the printed publication is a periodical publication;
an identification transmission module configured to transmit, to the server, the first image and the second image together in a single transmission to facilitate identification of the printed publication and the particular printed content at the server;
a supplemental content presentation module configured to receive via internet, responsive to (i) transmission of the first image and the second image by the identification transmission module, (ii) reception of identification of the printed publication and the particular printed content from the server, access to supplemental content associated with the particular printed content, wherein the supplemental content presentation module is further configured to present the supplemental content on the electronic display, wherein the supplemental content is not included in the printed publication, and wherein the supplemental content includes an image related to the particular printed content; and
wherein the server is communicatively linked with the client computing platform and the electronic storage, wherein the server comprises:
server computer program modules; and
one or more physical processors configured to execute the server computer program modules, the server computer program modules comprising:
an image reception module configured to receive the single transmission of the first image and second image from the client computing platform;
an identification reception module configured to identify the printed publication based on the first image by image comparison with the content images stored in the electronic storage,
a content matching module configured to identify the particular printed content based on the second image by image comparison with the content images stored in the electronic storage of the identified printed publication, responsive to identification of the printed publication;
a supplemental content module configured to obtain the supplemental content associated with the particular printed content, wherein the supplemental content module is further configured to transmit directions to the client computing platform to facilitate access to the supplemental content.

10. The system of claim 9, wherein the supplemental content presentation module is further configured to obtain the supplemental content from a network location.

11. The system of claim 9, wherein the first image includes a front cover of the printed publication.

12. The system of claim 9, wherein the client computer program modules further comprise a content processing module configured to process the first image and the second image prior to transmission to the server.

13. The system of claim 9, wherein the client computer program modules further comprise a server connection module configured to monitor a strength of a communication connection with the server.

14. The system of claim 13, wherein the identification transmission module is further configured to hold transmission of the first image and the second image to the server responsive to the strength of the communication connection with the server falling below a threshold.

* * * * *